(12) United States Patent
Dieno et al.

(10) Patent No.: US 7,491,050 B2
(45) Date of Patent: Feb. 17, 2009

(54) MOLD CLAMPING UNIT

(75) Inventors: Kurt Dieno, Rosstal (DE); Andreas Kübel, Lauf (DE)

(73) Assignee: Demag Ergotech Gmbh, Schwaig (DE)

( * ) Notice: Subject to any disclaimer, the term of this patent is extended or adjusted under 35 U.S.C. 154(b) by 156 days.

(21) Appl. No.: 11/614,453

(22) Filed: Dec. 21, 2006

(65) Prior Publication Data

US 2007/0098839 A1    May 3, 2007

Related U.S. Application Data

(63) Continuation of application No. PCT/EP2005/052135, filed on May 11, 2005.

(30) Foreign Application Priority Data

Jul. 6, 2004    (DE) ...................... 10 2004 023 521

(51) Int. Cl.
*B29C 45/64* (2006.01)

(52) U.S. Cl. .................... 425/190; 425/451.7; 425/593; 425/595

(58) Field of Classification Search ................ 425/190, 425/593, 595, 451.6, 451.7, 451.9
See application file for complete search history.

(56) References Cited

U.S. PATENT DOCUMENTS

| | | | | |
|---|---|---|---|---|
| 3,604,058 A | * | 9/1971 | Fischbach | .................... 425/150 |
| 4,105,390 A | * | 8/1978 | Hehl | ........................ 425/450.1 |
| 4,984,980 A | * | 1/1991 | Ueno | .......................... 425/595 |
| 6,875,006 B2 | * | 4/2005 | Fischbach | ................. 425/451.7 |
| 6,986,657 B2 | * | 1/2006 | Kappelmuller et al. | ... 425/451.7 |
| 7,112,058 B2 | * | 9/2006 | Felix | ........................ 425/451.7 |

FOREIGN PATENT DOCUMENTS

| | | |
|---|---|---|
| DE | 26 23 392 A1 | 12/1977 |
| DE | 101 61 911 C | 6/2003 |
| DE | 102 10 869 C | 7/2003 |
| DE | 103 08 623 A1 | 10/2003 |
| JP | 63 212522 A | 9/1988 |

* cited by examiner

*Primary Examiner*—James Mackey
(74) *Attorney, Agent, or Firm*—Henry M. Feiereisen; Ursula B. Day

(57) ABSTRACT

A mold clamping unit includes a mold height adjustment system having a length-adjustable threaded connection, comprised of a threaded spindle and a spindle nut which supports a platen of a molding tool, for stroke transmission and transmitting a locking force in clamping position. A clamping mechanism, which locks the spindle nut in relation to the threaded spindle and is selectively releasable for length adjustment of the threaded connection, includes a clamping nut, connected in fixed rotative engagement with and coupled for slight axial displacement in relation to the spindle nut, and an actuator, switchable between an active position, in which the spindle nut is braced with the clamping nut by a tightening force so that the platen is urged against the spindle nut, and an idle position, in which the actuator is released and which can be implemented irrespective of a stroke position of the drive mechanism. The threaded spindle and the platen are coupled to each other directly via the spindle nut for transmitting the clamping and locking forces, and via the actuator for transmitting an opening force in opposition to the clamping force.

13 Claims, 1 Drawing Sheet

MOLD CLAMPING UNIT

CROSS-REFERENCES TO RELATED APPLICATIONS

This application is a continuation of prior filed copending PCT International application no. PCT/EP2005/052135, filed May 11, 2005, which designated the United States and has been published but not in English as International Publication No. WO 2006/003046 and on which priority is claimed under 35 U.S.C. §120, and which claims the priority of German Patent Application, Serial No. DE 10 2004 032 521.9, filed Jul. 6, 2004, pursuant to 35 U.S.C. 119(a)-(d), the contents of which are incorporated herein by reference in its entirety as if fully set forth herein.

BACKGROUND OF THE INVENTION

The present invention relates, in general, to the field of mold clamping units.

Nothing in the following discussion of the state of the art is to be construed as an admission of prior art.

German Pat. No. 101 61 911 C1 describes a mold clamping unit having a movable platen which is adjustably connected by means of a spindle nut to tie bars, constructed in an adjustment zone as threaded spindle, for adapting the mold installation height to particular requirements. A switching mechanism in the form of a hydraulic servomotor acts between the movable platen and the spindle nut in order to clear in release position the axial play between the spindle nut and the movable platen so as to enable the spindle nut to rotate, and to brace the spindle nut in active state free of play and non-rotatably on the platen to thereby lock the adjusted mold installation height upon the threaded connection. Such an adjustment system for adapting the mold installation height has shortcomings because the play between spindle nut and tie bar cannot be eliminated. As a result, the thread flanks encounter sudden load changes, when the movable platen reverses direction, causing annoying noise development and especially requiring a hydraulic servomotor that must be constructed powerful enough to be able to withstand the stress experienced during aplication of the high clamping forces and the much higher locking forces between the movable platen and the tie bar.

German Pat. No. 102 10 869 C1 describes a mold clamping unit having a support platen which is rigidly connected with a fixed platen via tie bars and threadably connected via a spindle nut for lengthwise displacement with the tie bar end portions for realizing a mold height adjustment. The spindle nut is locked by a counternut which is threadably connected to the tie bars and braced with the spindle nut by resilient elements acting between the counternut and the support platen. A switch to the release position is effected by the stroke drive which moves the movable platen beyond the normal opening position so that the spindle nut and the counternut are no longer clamped to one another and the spindle nut can be turned by a rotary drive to a new mold installation height. As a consequence, essential components of the clamping unit, in particular the stroke drive applying the locking force must be oversized and the length of the tie bars must be configured longer to account for the required added stroke travel to release the mold height adjustment.

It would therefore be desirable and advantageous to provide an improved mold clamping unit which obviates prior art shortcomings and which is simple and compact in construction to attain a reliable release and play-free locking of the mold height adjustment, without experiencing any downtimes in operation of the mold clamping unit.

SUMMARY OF THE INVENTION

According to one aspect of the present invention, a mold clamping unit, in particular for an injection molding machine, includes a fixed first platen, a movable second platen, a drive mechanism for implementing a displacement of the second platen, at least one length-adjustable threaded connection for adjusting a mold height, wherein the threaded connection is comprised of a threaded spindle and a spindle nut which is arranged on the threaded spindle and supports one of the first and second platens, for transmitting a stroke and transmitting a locking force, when the second platen assumes a clamping position, and a clamping mechanism locking the spindle nut in relation to the threaded spindle and being selectively releasable for length adjustment of the threaded connection, with the clamping mechanism including a clamping nut, which is connected in fixed rotative engagement with the spindle nut and coupled for slight axial displacement in relation to the spindle nut, and an actuator, which is switchable between an active position, in which the spindle nut is braced with the clamping nut by a tightening force so that the one of the platens is urged against the spindle nut, and an idle position, in which the actuator is released and which is implementable irrespective of a stroke position of the drive mechanism, wherein the threaded spindle and the one of the platens are coupled to each other directly via the spindle nut for transmitting the clamping and locking forces, and via the actuator for transmitting an opening force in opposition to the tightening force applied by the actuator.

The present invention resolves prior art problems by providing a threaded engagement of the threaded spindle with two components, namely the clamping nut and the spindle nut, whereby the clamping nut and the spindle nut are braced with one another and with the respective platen in the active state while the actuator is freed from any locking forces. Thus, release and locking of the mold height adjustment can be implemented in accordance with the present invention with an adjustment system which, compared to conventional systems that must be dimensioned powerful enough to cope with the locking forces, can be constructed with much less power output, namely up to six times less power output, so that space requirements and energy need of a mold height adjustment system according to the invention can be significantly reduced. In addition, the platen remains on the threaded spindle without axial play and without thread-to-thread clearance, when the actuator applies the tightening force, even when the stroke changes. Still the mold height adjustment can be changed independently of the stroke position even during a travel of the moving platen.

According to another feature of the present invention, an operating mechanism may be provided for shifting the actuator to the active position in order to apply the tightening force, with the actuator being constructed to spontaneously return to the idle position, when the operating mechanism is no longer effective. In this way, overall construction is simplified, the switching reliability is enhanced, and the need for elastic biasing or return elements is eliminated.

According to another feature of the present invention, the operating mechanism may be constructed as a hydraulic mechanism or pneumatic mechanism. In this, way, the operating mechanism can be integrated in the existing hydraulic or pneumatic system of the mold clamping unit.

According to another feature of the present invention, the threaded spindle may be restrained against rotation, and the spindle nut may be rotatably arranged on the respective one of the platens with axial play, wherein the actuator can be securely fixed to this platen, while the clamping nut is rotatably connected to the platen, when the actuator assumes the idle position. In this way, the mold height adjustment system can be made especially compact and robust. Suitably, a rotary drive may be provided for rotating the combination of spindle nut and clamping nut for length adjustment of the threaded connection, when the actuator assumes the idle position.

According to another feature of the present invention, the actuator can be disposed in surrounding relationship with overmeasure to the threaded spindle on a side of the spindle nut distal to the respective one of the platens, and has an actuator housing which may be mounted to this platen, wherein the clamping nut is positioned between the actuator and the spindle nut and loaded in a direction of the spindle nut, when the actuator is acted upon by a pressure force from the operating mechanism and assumes the active position. As a result, the space requirement for the arrangement of the spindle and clamping nuts and actuator can be further reduced.

The present invention is applicable for mold clamping units without tie bars as well as for mold clamping units having tie bars for the movable platen. In an embodiment with tie bars, it is currently preferred when the respective platen supports the drive mechanism, while the clamping mechanism is arranged on this platen. In a three-platen construction with a support platen, the support platen can be connected to the fixed platen by tie bars for the movable platen, wherein the actuator is arranged in an area of a tie bar portion of the tie bars which extends through the support platen and represents the threaded spindle for interaction with the clamping and spindle nuts.

According to another feature of the present invention, the drive mechanism may include a toggle mechanism for moving and locking the movable platen in the clamping position, with the toggle mechanism having a driving toggle lever articulated to the support platen for mold height adjustment thereof.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
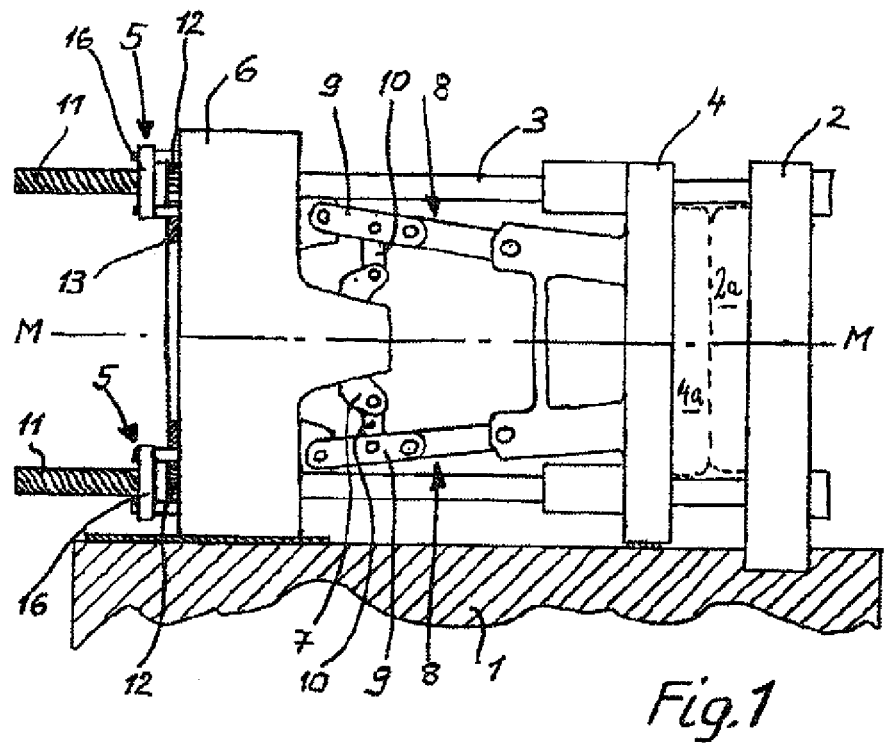
FIG. 1 is a side view of a mold clamping unit according to the present invention.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a side view of a mold clamping unit according to the present invention, constructed, by way of example, in the form of a three-platen machine. The mold clamping unit includes a first platen 2, which carries a half-mold 2a and is fixedly mounted onto a machine bed 1, a second platen 4, which carries a half-mold 4a and is guided on tie bars 3 for movement in a direction of a machine axis M-M, and a third platen 6, which is connected to the fixed platen 2 via the tie bars 3 and longitudinally adjustable in direction of tie bar axis L-L (FIG. 2) by a mold height adjustment system, generally designated by reference numeral 5. The third platen 6 forms hereby a support platen for a stroke drive of the movable platen 4. The stroke drive includes a linear drive (not shown), which is mounted to the platen 6, a yoke assembly 7, which is driven by the linear drive for movement in stroke direction and secured to the support platen 6, and toggle bar linkages 8 arranged in pairs as mirror images with respect to the machine axis M-M and articulated on one end to the movable platen 4 and on another end to the support platen 6. The toggle bar linkages 8 are operated in pivot direction by the yoke assembly 7 via respective intermediate levers 10 which are articulated to the yoke assembly 7 and to toggle levers 9 of the toggle bar linkages 8. As a result, the movable platen 4 can be moved in a direction of the fixed platen 2 and locked, when the half-molds 2a, 4a assume the clamping position, as shown by broken lines in FIG. 1.

Figure 2:
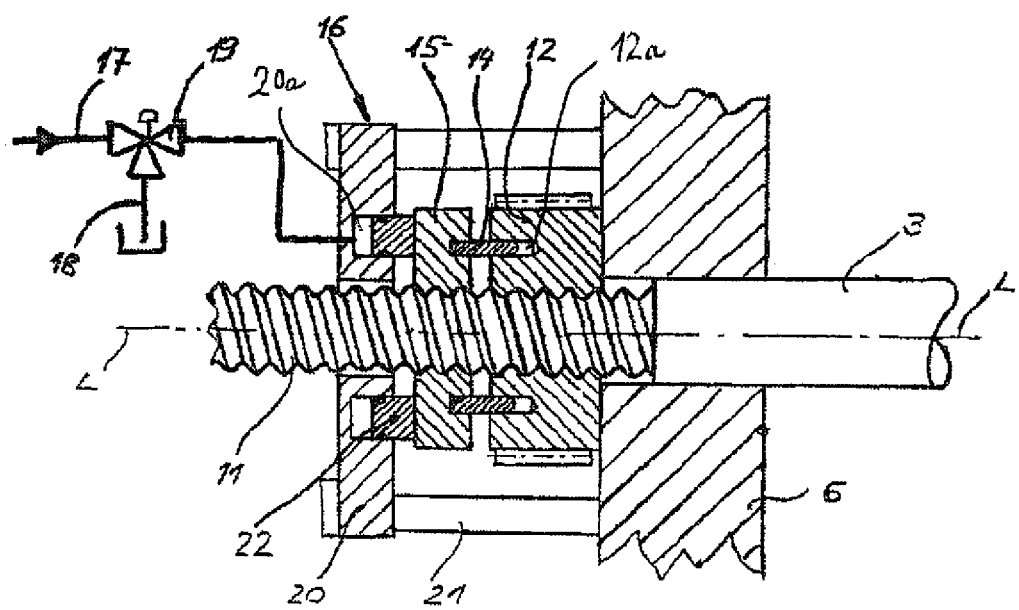
FIG. 2 is a partly sectional view, on an enlarged scale, of a detail of the mold clamping unit in an area of the mold height adjustment.

FIG. 2, which is a partly sectional cutaway view, on an enlarged scale, of the mold clamping unit, shows in detail the mold height adjustment system of the mold clamping unit in conjunction with one of the tie bars 3. As all the tie bars 3 are of an identical construction, it will be understood by persons skilled in the art that a description of one tie bar 5 is equally applicable to the other tie bars 5. Each of the tie bars 3 (again, only one is shown in FIG. 2 for sake of simplicity) extends through the support platen 6 and has an end portion configured in the form of a threaded spindle 11. Disposed on the backside of the support platen 6 is a spindle nut 12 which is in threaded engagement with the threaded spindle 11.

A rotary drive, shown schematically by way of a sun wheel 13 in FIG. 1, is in meshing engagement with all the spindle nuts 12 on the tie bars 5 to jointly rotate the spindle nuts 12 and thereby modify and correct a position of the support platen 6 in relation to the tie bars 3. When a mold height position of the support platen 6 has been properly adjusted in this way, a clamping mechanism of the mold height adjustment system becomes effective by which an axial play, otherwise required between the spindle nut 12 and the support platen 6 for allowing an adjustment of the spindle nut 12, is eliminated, and by which the spindle nut 12 is non-rotatably braced with the threaded spindle 11, free of any thread-to-thread clearance.

The clamping mechanism includes a clamping nut 15, which is positioned on the threaded spindle 11 of the tie bar 3 on the side of the spindle nut 12 facing away from the support platen 6, and an actuator 16 which is operated hydraulically. The clamping nut 15 is connected in fixed rotative engagement with the spindle nut 12, e.g. by means of pins 14 which project into pockets 12 of the spindle nut 12, whereby the pockets 12a are axially dimensioned to allow the clamping nut 15 to move axially relative to the spindle nut 12 in accordance with the thread-to-thread clearance. The actuator 16 is operated by a hydraulic or pneumatic system, comprised of a pressure line 17, a vent line 18, and a three-way valve 19 which regulates a flow of fluid between the actuator 16, on one hand, and the pressure line 17 or vent line 18, on the other hand. In this way, the actuator 16 can be switched between an idle (release) position, in which no pressure is applied by the actuator 16, and an active position, in which a tightening force is generated.

The actuator 16 has an actuator housing 20 which is placed in surrounding relationship to the threaded spindle 11 with overmeasure and firmly mounted to the support platen 6 by means of spacer rods 21. The actuator housing 20 has a chamber 20a for receiving an annular pressure piston 22 which is arranged in concentric relationship to the tie bar axis L-L and rotates conjointly with the clamping nut 15 and which may be formed in one piece with the clamping nut 15. Of course, it is also conceivable to provide a plurality of single pressure pistons which are arranged in uniform spaced-apart relationship about the tie bar axis L-L and permit a rotation of the clamping nut 15 in relation to the actuator housing 20, when the actuator 16 assumes the idle position.

When the actuator 16 is in the active position and the chamber 20a is under pressure, the support platen 6 is pressed via the actuator housing 20 against the spindle nut 12 while the clamping nut 15 is moved in opposite direction to the support platen 6 by the pressure piston 22 against the spindle nut 12 and thus is clamped onto the threaded spindle 11 of the tie bar 3. As a consequence, the support platen 6 is coupled with the tie bars 3 without axial play and without thread-to-thread clearance, and the clamping nut 15 as well as spindle nut 12 are securely fixed, non-rotatably, to the threaded spindle 11. As the actuator 16 is in the active position, the clamping force and the normally much higher locking force, which are applied during clamping operation by the stroke drive 7, 8, 19 upon the moving platen 4 and cause reaction forces on the support platen 6, are transmitted directly by the support platen 6 via the spindle nut 12 onto the tie bars 3 so that the actuator 16 is liberated from these loads and is required to transmit only those reaction forces which are applied during opening and unlocking of the molding tool upon the support platen 6 and which are considerably smaller—by about 85%—in comparison to the reaction forces during clamping operation. These much smaller reaction forces are hereby transmitted via the actuator housing 20 and the pressure piston 22 in opposition to the tightening force applied by the pressure piston 22 onto the clamping nut 15 and the tie bars 3. Thus, the actuator 16 can be constructed less powerful and compact compared to the power demands and sizes of conventional servo drives and stroke drives that generate respective clamping and locking forces.

To release the actuator 16 and thus to switch it to the idle position, the three-way valve 19 is switched to connect the pressure chamber 20a with the vent line 18 so as to remove the tightening force so that the clamping nut 15 and the spindle nut 12 are again positioned at an axial play with respect to the support platen 6 and with thread-to-thread clearance with respect to the threaded spindle 11 so that both the clamping nut 15 and the spindle nut 12 can be rotated by the rotary drive (sun wheel 13) unimpeded for adjustment of a new mold height position of the support platen 6 in relation to the tie bars 3.

As the release and rotating operations including the renewed clamping operation by the arrangement of clamping nut 15, spindle nut 12 and actuator 16 can be quickly implemented in the opening phase of the movable platen 4, mold height adjustment of the mold clamping unit can be executed during ongoing operation without any loss of time.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A mold clamping unit, comprising:
   a fixed first platen;
   a movable second platen;
   a drive mechanism for implementing a displacement of the second platen;
   at least one length-adjustable threaded connection for adjusting a mold height, wherein the threaded connection is comprised of a threaded spindle and a spindle nut which is arranged on the threaded spindle and supports one of the first and second platens, for transmitting a stroke and transmitting a locking force, when the second platen assumes a clamping position; and
   a clamping mechanism locking the spindle nut in relation to the threaded spindle and being selectively releasable for length adjustment of the threaded connection, with the clamping mechanism including a clamping nut, which is connected in fixed rotative engagement with the spindle nut and coupled for slight axial displacement in relation to the spindle nut, and an actuator, which is switchable between an active position, in which the spindle nut is braced with the clamping nut by a tightening force so that the one of the platens is urged against the spindle nut, and an idle position, in which the actuator is released and which is implementable irrespective of a stroke position of the drive mechanism,
   wherein the threaded spindle and the one of the platens are coupled to each other directly via the spindle nut for transmitting the clamping and locking forces, and via the actuator for transmitting an opening force in opposition to the tightening force applied by the actuator.

2. The mold clamping unit of claim 1, further comprising an operating mechanism operatively connected to the actuator for causing the actuator to assume the active position and allowing the actuator to spontaneously return to the idle position.

3. The mold clamping unit of claim 2, wherein the operating mechanism is a hydraulic mechanism.

4. The mold clamping unit of claim 2, wherein the operating mechanism is a pneumatic mechanism.

5. The mold clamping unit of claim 1, wherein the threaded spindle is restrained against rotation, and the spindle nut is rotatably arranged on the one of the platens with axial play, said actuator being securely fixed to the one of the platens, and said clamping nut being rotatably connected to the one of the platens via the actuator, when the actuator assumes the idle position.

6. The mold clamping unit of claim 1, further comprising a rotary drive for length adjustment of the threaded connection, when the actuator assumes the idle position.

7. The mold clamping unit of claim 6, wherein the rotary drive includes a sun wheel in engagement with the spindle nut.

8. The mold clamping unit of claim 1, wherein the actuator is placed in surrounding relationship with overmeasure to the threaded spindle on a side of the spindle nut distal to the one of the platens, said actuator having an actuator housing which is secured to the one of the platens, said clamping nut positioned between the actuator housing and the spindle nut and loaded in a direction of the spindle nut, when the actuator is acted upon by a pressure force and assumes the active position.

9. The mold clamping unit of claim 1, wherein the one of the platens supports the drive mechanism, said clamping mechanism being arranged on the one of the platens.

10. The mold clamping unit of claim 9, further comprising a support platen which represents the one of the platens and is connected to the fixed platen by tie bars for the movable platen, wherein the actuator is arranged in an area of a tie bar portion of the tie bars which extends through the support platen and represents the threaded spindle for interaction with the clamping and spindle nuts.

11. The mold clamping unit of claim 10, further comprising a plurality of clamping mechanisms for interaction with the tie bars in one-to-one correspondence, wherein the actuators of the clamping mechanisms are switchable simultaneously.

12. The mold clamping unit of claim 1, wherein the drive mechanism includes a toggle mechanism for moving and locking the movable platen in a clamping position, said toggle mechanism having a driving toggle lever articulated to the one of the platens.

13. A mold clamping unit, comprising:

a spindle drive mechanism adapted for transmitting clamping and locking forces upon a molding tool, said spindle drive mechanism including a threaded spindle and a spindle nut disposed on the threaded spindle and adjoining a first platen of the molding tool; and a mold height adjustment system for adjusting a position of the first platen in relation to a second platen of the molding tool, said mold height adjustment system including a clamping nut which is connected in fixed rotative engagement with the spindle nut and coupled for axial displacement in relation to the spindle nut, and a fluid-operated actuator, which is switchable between a pressure-applying state for engaging the clamping nut with the spindle drive mechanism in the clamping position, and a pressure-relieving state for disengaging the clamping nut from the spindle drive mechanism irrespective of an application of the clamping and locking forces to allow a readjustment of the first platen in relation to the second platen.

* * * * *

UNITED STATES PATENT AND TRADEMARK OFFICE
CERTIFICATE OF CORRECTION

PATENT NO. : 7,491,050 B2  Page 1 of 1
APPLICATION NO. : 11/614453
DATED : February 17, 2009
INVENTOR(S) : Kurt Dieno and Andreas Kübel It is certified that error appears in the above-identified patent and that said Letters Patent is hereby corrected as shown below:

Title Page, Item

(30)    Foreign Application Priority Data

Delete No. "10 2004 023 521" and replace with the correct Priority

No. --10 2004 032 521--.

Signed and Sealed this

Thirty-first Day of March, 2009

JOHN DOLL
*Acting Director of the United States Patent and Trademark Office*